Figure 1:
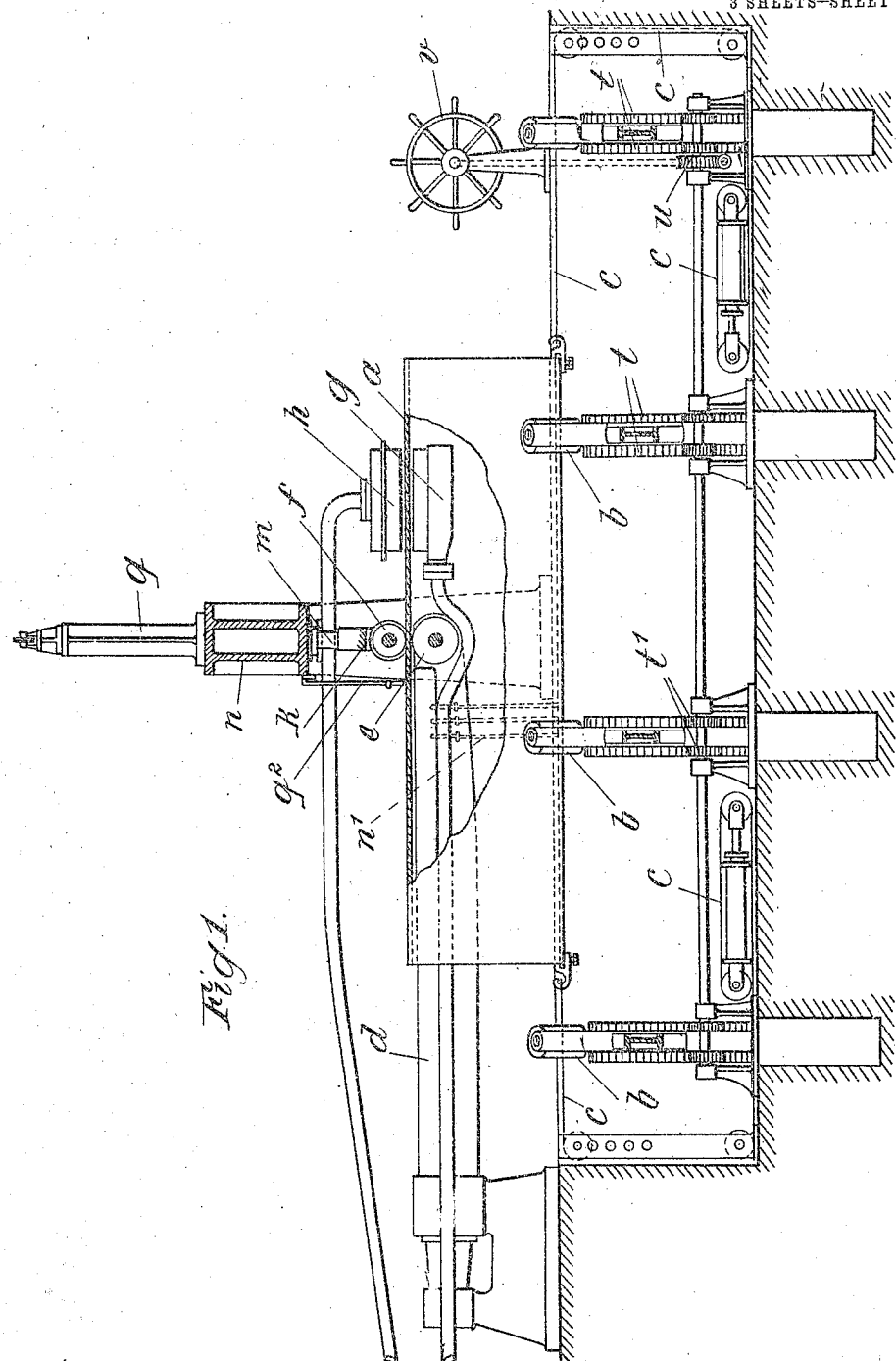

E. DOLENSKY.
WELDING APPARATUS.
APPLICATION FILED FEB. 2, 1910.

1,042,411.

Patented Oct. 29, 1912.
3 SHEETS—SHEET 2.

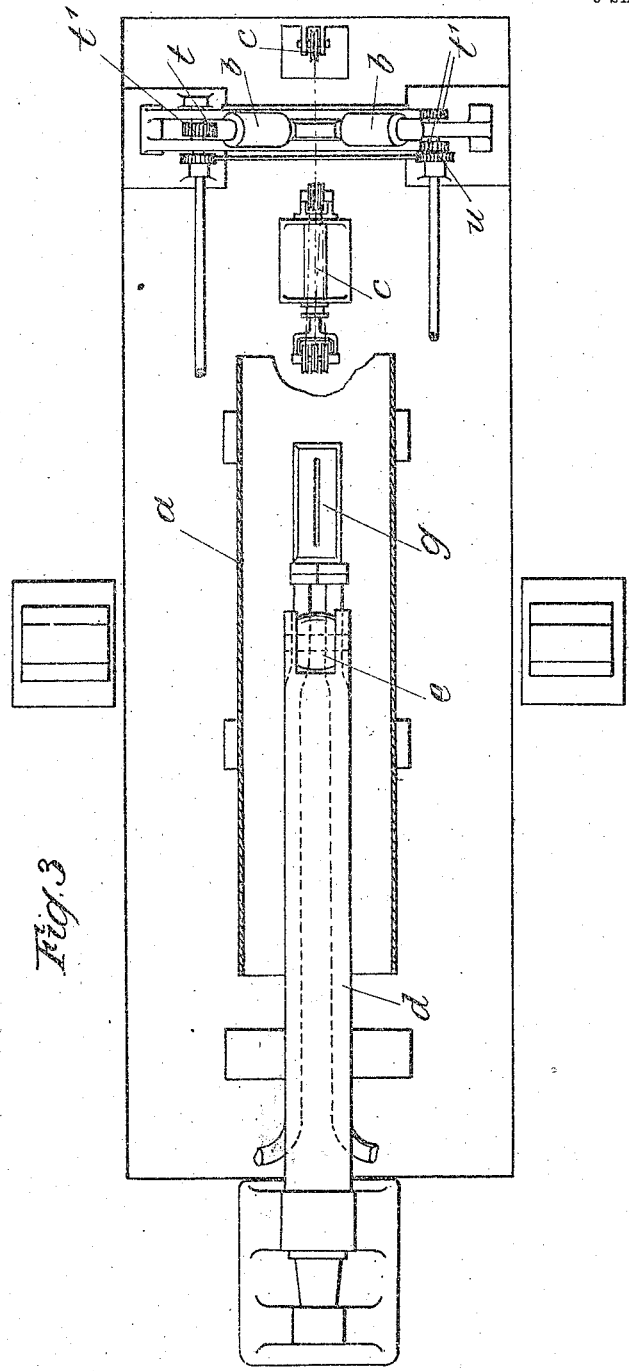

UNITED STATES PATENT OFFICE.

EUGEN DOLENSKY, OF FRANKFORT-ON-THE-MAIN, GERMANY, ASSIGNOR TO THE CORPORATION OF DELLWIK-FLEISCHER WASSERGAS GESELLSCHAFT M. B. H., OF FRANKFORT-ON-THE-MAIN, GERMANY.

WELDING APPARATUS.

1,042,411.  Specification of Letters Patent.  Patented Oct. 29, 1912.

Application filed February 2, 1910. Serial No. 541,597.

*To all whom it may concern:*

Be it known that I, EUGEN DOLENSKY, engineer, a subject of the Austro-Hungarian Emperor, and resident of Frankfort-on-the-Main, Germany, (whose post-office address is Wielandstrasse No. 40,) have invented new and useful Improvements in Welding Apparatus, of which the following is a specification.

In the usual welding processes the closing of the joint is effected either by hammering or by pressing between rollers. The first of these treatments has the drawback that the metal may be rendered too thin by the hammering, and the article made too weak at the welded joint. In addition the strong and heavy vibration set up injuriously affects the life of the burner blocks in the case of welding with gas flame. In welding by the aid of presses or press rollers or suitably disposed eccentrics, it is true that a quieter and more uniform pressure is exerted, but in this case the slag is often imperfectly forced out and the overheated, and therefore crystalline, material is not sufficiently worked to render it tough again.

The new apparatus, which is specially intended for welding pipes, but may also be applied to other welded articles, admits of the combination of the two methods of treatment in a special manner and thus obviates the defects of both. The welding is performed under a fluctuating pressure, which has one constant factor, corresponding to the old pressing pressure, and in addition a rapidly started and terminated increase of this pressure corresponding to the hammering treatment. In this way an effect is produced which in the augmentation and diminution of the pressure is analogous to kneading. This pressure effect can be brought about in various ways. For example the pressure roller may be subjected to a constant pressure, e. g. of a press cylinder; and then blows may be struck on this pressure roller by a hammer, the pressure of which blows is added to the steady pressure of the press. Moreover, a kneading effect can be produced by a rapidly alternating vibratory pressure, for example by the use of a highspeed hammer run at a speed corresponding to that of pneumatic tools, an intermediate member such as a roller, eccentric or the like operated by a press cylinder, being preferably introduced between the hammer and the work, since the ram of a high-speed hammer does not move up and down but remains always in place, so that it is impossible to move the welded joint along, at welding heat, immediately under the ram.

In the accompanying drawing the apparatus is illustrated in its application to the welding of a pipe.

Figure 2:
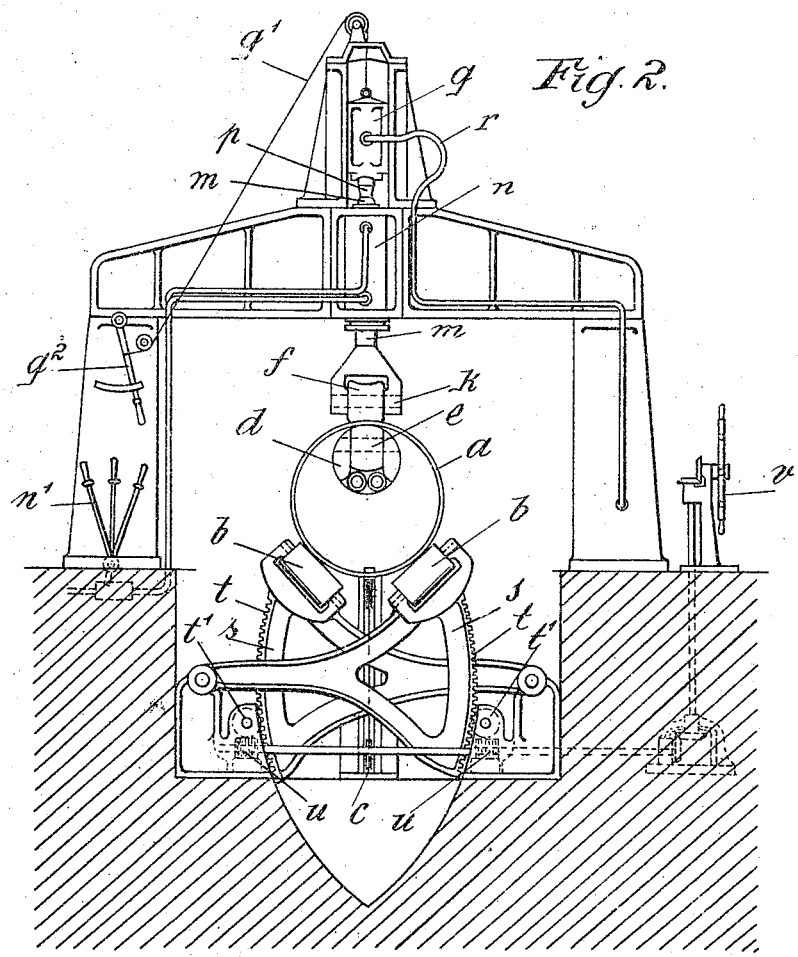

Figure 1 is a longitudinal section; Fig. 2 a cross section and Fig. 3 a plan view of a welding device for pipes.

$a$ is a pipe resting on adjustable carrier rollers $b$ and adapted to be moved in the direction of its longitudinal axis by means of a draft chain $c$. Into the pipe extends an anvil $d$ the front end of which carries a roller or abutment $e$, and alongside the anvil are the gas and air pipes which lead into the interior burner $g$, which is situated opposite to the exterior burner $h$. A roller or abutment $f$ works in conjunction with the roller or abutment $e$, and is mounted in a fork $k$ of the press piston rod $m$. The pressure medium is admitted into the top or bottom of the press cylinder $n$ by operating a lever $n^1$, the roller $f$ being thereby lowered or raised. The piston rod $m$ projects through the top of the press cylinder $n$ and is subjected to the action of a hammer $p$. The hammer cylinder $q$, is suspended in the known manner from a rope $q^1$ and can be raised or lowered by the lever $q^2$. When it is lowered into contact with the end surface of the piston rod $m$, it begins to work automatically, in the known manner, under the influence of the pressure medium entering the cylinder $q$ through the flexible pipe $r$.

The carrier rollers $b$ rest on rocking quadrants $s$ which can be raised and lowered by means of the rack work $t$, $t^1$ and worm gear $u$ operated by the hand wheel $v$.

In the operation of welding a pipe with the above apparatus, the meeting edges of the metal are heated in the well known way by the gas flames emitted from the interior and exterior burners $g$, $h$, respectively, and the closing of the joint is effected by the rollers $e$, $f$, the latter of which is subjected to a relatively uniform pressure of the required degree through its connection with the pressure device $m$, $n$. The additional fluctuating or intermittent pressure necessary to produce the effect hereinbefore mentioned is imparted by the hammer device *p*, *q*, which is so controlled by the connections described as to act upon the piston rod *m* and roller *f* with a hammer action of the desired strength, rapidity, and duration. There is therefore a constant pressure of the desired value on the joint or seam which effectually closes the joint, and in addition thereto an intermittent or fluctuating pressure of the desired value which produces, with the first named pressure, a kneading of the metal which gives the latter the necessary toughness.

It is evident that the kneading action formed of two components, can be brought about in a variety of ways without departing from the invention, and it is to be understood that the invention is not limited to the particular form of apparatus shown and described, which latter is merely exemplary.

Now what I claim and desire to secure by Letters Patent is the following:

1. In a welding apparatus, a joint-heating device, means for constantly maintaining pressure on the joint during the welding operation, and means for intermittently varying the pressure with rapidly-recurring frequency, whereby during the welding operation the metal to be welded is subjected simultaneously to pressure and to an action analogous to kneading.

2. In a welding apparatus, a joint-heating device, means for constantly maintaining pressure on the joint during the welding operation, and means for exerting an auxiliary increased intermittent pressure thereon of a rapidly-recurring frequency, whereby during the welding operation the metal to be welded is subjected to uninterrupted pressure and to an auxiliary intermittent higher pressure accompanied by an action analogous to kneading.

3. In a welding apparatus, a joint-heating device, fluid pressure means for constantly maintaining pressure on the joint during the welding operation, and means for intermittently varying the pressure with rapidly-recurring frequency whereby during the welding operation the metal to be welded is subjected simultaneously to pressure and to an action analogous to kneading.

4. In a welding apparatus, a joint heating device, rollers between which the joint to be welded passes, means for constantly maintaining pressure between the rollers and the joint during the welding operation, and means for exerting an auxiliary intermittent pressure thereon of rapidly-recurring frequency, whereby during the welding operation the metal to be welded is subjected to uninterrupted pressure and to an auxiliary intermittent higher pressure accompanied by an action analogous to kneading.

5. In a welding apparatus, a joint heating device, coöperating abutments between which the joint to be welded passes, means for constantly maintaining pressure between said abutments and the joint during the welding operation, and means for intermittently varying the pressure with rapidly-recurring frequency, whereby during the welding operation the metal to be welded is subjected to uninterrupted pressure and to an auxiliary intermittent higher pressure accompanied by an action analogous to kneading.

6. In a welding apparatus, a joint-heating device, coöperating abutments between which the joint to be welded passes, a fluid pressure device for constantly maintaining pressure between the abutments and the joint during the welding operation, and a reciprocating hammer device for exerting an auxiliary increased intermittent pressure of rapidly-recurring frequency on the joint, whereby during the welding operation the metal to be welded is subjected to uninterrupted pressure and to an auxiliary intermittent higher pressure accompanied by an action analogous to kneading.

7. In an apparatus for wielding, the combination of a heating device, rollers between which the joint to be welded passes, and a hammer acting on the rollers.

In testimony, that I claim the foregoing as my invention, I have signed my name in presence of two witnesses, this 20th day of January 1910.

EUGEN DOLENSKY.

Witnesses:
BERNHARD SPITSER,
HEINRICH EMMERICH.